(12) United States Patent
Moradipari et al.

(10) Patent No.: US 12,420,842 B2
(45) Date of Patent: Sep. 23, 2025

(54) SYSTEMS AND METHODS FOR PARAMETER PREDICTION FOR AGENT MODELING

(71) Applicant: Honda Motor Co., Ltd., Tokyo (JP)

(72) Inventors: Ahmadreza Moradipari, Menlo Park, CA (US); Sangjae Bae, San Jose, CA (US); Ehsan Moradi Pari, Dublin, OH (US); David F. Isele, San Jose, CA (US)

(73) Assignee: Honda Motor Co., Ltd., Tokyo (JP)

( * ) Notice: Subject to any disclaimer, the term of this patent is extended or adjusted under 35 U.S.C. 154(b) by 342 days.

(21) Appl. No.: 17/694,455

(22) Filed: Mar. 14, 2022

(65) Prior Publication Data

US 2023/0286546 A1 Sep. 14, 2023

(51) Int. Cl.
*B60W 60/00* (2020.01)
*G05B 13/02* (2006.01)
*G05B 13/04* (2006.01)

(52) U.S. Cl.
CPC ..... *B60W 60/0027* (2020.02); *G05B 13/0265* (2013.01); *G05B 13/042* (2013.01); *B60W 2552/10* (2020.02); *B60W 2554/4046* (2020.02); *B60W 2554/406* (2020.02); *B60W 2554/801* (2020.02); *B60W 2554/802* (2020.02); *B60W 2554/804* (2020.02)

(58) Field of Classification Search
CPC ....... B60W 60/0027; B60W 2554/804; B60W 2554/406; B60W 2554/802; B60W 2554/4046; G05B 13/0265; G05B 13/042
See application file for complete search history.

(56) References Cited

U.S. PATENT DOCUMENTS

| | | | |
|---|---|---|---|
| 2016/0304097 A1* | 10/2016 | Taira | B60W 10/20 |
| 2019/0329778 A1* | 10/2019 | D'sa | G06V 20/56 |
| 2020/0047750 A1* | 2/2020 | Likhachev | G05D 1/0214 |
| 2020/0156626 A1* | 5/2020 | Mamchuk | B60W 60/0015 |

(Continued)

OTHER PUBLICATIONS

Treiber, Congested traffic states in empirical observations and microscopic simulations, vol. 62, No. 2, p. 1807 (Year: 2000).*

(Continued)

*Primary Examiner* — Anne Marie Antonucci
*Assistant Examiner* — Luis G Del Valle
(74) *Attorney, Agent, or Firm* — Rankin, Hill & Clark LLP

(57) ABSTRACT

Systems and methods for parameter prediction for agent modeling are provided. In one embodiment, a method includes determining a first driving code for a first proximate agent at a first time. The method also includes determining a first set of agent specific parameters for the first proximate agent based on the first driving code. The method further includes calculating a first predicted acceleration for the first proximate agent based on the first set of agent specific parameters. The first predicted acceleration is for a second time after the first time. The method yet further includes determining a first steering parameter for the first proximate agent. The method includes determining a first predicted behavior of the first proximate agent based on the first predicted acceleration and the first steering parameter. The method also includes controlling a host agent based on the first predicted behavior of the first proximate agent.

15 Claims, 4 Drawing Sheets

(56) References Cited

U.S. PATENT DOCUMENTS

| | | | | |
|---|---|---|---|---|
| 2020/0307599 | A1* | 10/2020 | Oka | B60W 60/00276 |
| 2021/0148727 | A1* | 5/2021 | Narayanan | B60W 30/095 |
| 2021/0276546 | A1* | 9/2021 | Rahman | B60W 30/09 |
| 2022/0306152 | A1* | 9/2022 | Zhang | B60W 30/18159 |
| 2023/0055032 | A1* | 2/2023 | Bouchet | B62D 5/0469 |
| 2023/0080281 | A1* | 3/2023 | Kundu | G06N 5/022 |
| | | | | 701/410 |

OTHER PUBLICATIONS

R. P. Bhattacharyya, R. Senanayake, K. Brown, and M. J. Kochenderfer, "Online parameter estimation for human driver behavior prediction," in 2020 American Control Conference (ACC). IEEE, 2020, pp. 301-306.

M. Bouton, A. Cosgun, and M. J. Kochenderfer, "Belief state planning for autonomously navigating urban Intersections," in 2017 IEEE Intelligent Vehicles Symposium (IV). IEEE, 2017, pp. 825-830.

M. Bouton, A. Nakhaei, D. Isele, K. Fujimura, and M. J. Kochenderfer, "Reinforcement learning with iterative reasoning for merging in dense traffic," in 2020 IEEE 23rd International Conference on Intelligent Transportation Systems (ITSC). IEEE, 2020, pp. 1-6.

S. Casas, A. Sadat, and R. Urtasun, "Mp3: A unified model to map, perceive, predict and plan," in Proceedings of the IEEE/CVF Conference on Computer Vision and Pattern Recognition, 2021, pp. 14 403-14 412.

C. Choi, S. Malla, A. Patil, and J. H. Choi, "Drogon: A trajectory prediction model based on intention-conditioned behavior reasoning," arXiv preprint arXiv:1908.00024, 2019.

R. C. Coulter, "Implementation of the pure pursuit path tracking algorithm," Carnegie-Mellon UNIV Pittsburgh PA Robotics INST, Tech. Rep., 1992.

O. Derbel, T. Peter, H. Zebiri, B. Mourllion, and M. Basset, "Modified intelligent driver model for driver safety and traffic stability improvement," IFAC Proceedings vols. vol. 46, No. 21, pp. 744-749, 2013.

J. Eggert, F. Damerow, and S. Klingelschmitt, "The foresighted driver model," in 2015 IEEE Intelligent Vehicles Symposium (IV). IEEE, 2015, pp. 322-329.

C.-J. Hoel, K. Driggs-Campbell, K. Wolff, L. Laine, and M. J. Kochenderfer, "Combining planning and deep reinforcement learning in tactical decision making for autonomous driving," IEEE transactions on intelligent vehicles, vol. 5, No. 2, pp. 294-305, 2019.

S. Hoermann, D. Stumper, and K. Dietmayer, "Probabilistic long-term prediction for autonomous vehicles," in 2017 IEEE Intelligent Vehicles Symposium (IV). IEEE, 2017, pp. 237-243.

C. Hubmann, J. Schulz, G. Xu, D. Althoff, and C. Stiller, "A belief state planner for interactive merge maneuvers in congested traffic," in 2018 21st International Conference on Intelligent Transportation Systems (ITSC). IEEE, 2018, pp. 1617-1624.

D. Isele, "Interactive decision making for autonomous vehicles in dense traffic," in 2019 IEEE Intelligent Transportation Systems Conference (ITSC), 2019.

A. Kesting, M. Treiber, and D. Helbing, "Enhanced intelligent driver model to access the impact of driving strategies on traffic capacity," Philosophical Transactions of the Royal Society A: Mathematical, Physical and Engineering Sciences, vol. 368, No. 1928, pp. 4585-4605, 2010.

A. Kesting, M. Treiber, and D. Helbing, "General lane-changing model mobil for car-following models," Transportation Research Record, vol. 1999, No. 1, pp. 86-94, 2007.

J. Kong, M. Pfeiffer, G. Schildbach, and F. Borrelli, "Kinematic and dynamic vehicle models for autonomous driving control design," in 2015 IEEE Intelligent Vehicles Symposium (IV), 2015, pp. 1094-1099.

S. Levine and V. Koltun, "Continuous inverse optimal control with locally optimal examples," arXiv preprint arXiv:1206.4617, 2012.

J. Li, F. Yang, M. Tomizuka, and C. Choi, "Evolvegraph: Multi-agent trajectory prediction with dynamic relational reasoning," Advances in neural information processing systems, vol. 33, pp. 19 783-19 794, 2020.

M. Lundgren, "Path tracking and obstacle avoidance for a miniature robot," Umeå University, Umeå, Master Thesis, p. 238, 2003.

Y. Ma, Z. Wang, H. Yang, and L. Yang, "Artificial intelligence applications in the development of autonomous vehicles: a survey," IEEE/CAA Journal of Automatica Sinica, vol. 7, No. 2, pp. 315-329, 2020.

T. Osa, J. Pajarinen, G. Neumann, J. A. Bagnell, P. Abbeel, and J. Peters, "An algorithmic perspective on imitation earning," arXiv preprint arXiv:1811.06711, 2018.

V. Pestov, "Is the k-nn classifier in high dimensions affected by the curse of dimensionality?" Computers & Mathematics with Applications, vol. 65, No. 10, pp. 1427-1437, 2013.

D. A. Pomerleau, "Alvinn: An autonomous land vehicle in a neural network," Advances in neural information processing systems, vol. 1, 1988.

C. Schöller, V. Aravantinos, F. Lay, and A. Knoll, "What the constant velocity model can teach US about pedestrian motion prediction," IEEE Robotics and Automation Letters, vol. 5, No. 2, pp. 1696-1703, 2020.

J. Schulman, F. Wolski, P. Dhariwal, A. Radford, and O. Klimov, "Proximal policy optimization algorithms," arXiv preprint arXiv:1707.06347, 2017.

M. Treiber, A. Hennecke, and D. Helbing, "Congested traffic states in empirical observations and microscopic simulations," Physical review E, vol. 62, No. 2, p. 1805, 2000.

L. Wang, Y. Hu, L. Sun, W. Zhan, M. Tomizuka, and C. Liu, "Transferable and adaptable driving behavior prediction," arXiv preprint arXiv:2202.05140, 2022.

B. D. Ziebart, A. Maas, J. A. Bagnell, and A. K. Dey, "Maximum entropy inverse reinforcement learning," in Proc. AAAI, 2008, pp. 1433-1438.

N. Evestedt, E. Ward, J. Folkesson, and D. Axehill, "Interaction aware trajectory planning for merge scenarios in congested traffic situations," in 2016 IEEE 19th International Conference on Intelligent Transportation Systems (ITSC). IEEE, 2016, pp. 465-472.

P. Liu and W. Fan, "Exploring the impact of connected and autonomous vehicles on freeway capacity using a revised Intelligent driver model," Transportation planning and technology, vol. 43, No. 3, pp. 279-292, 2020.

S. Noh, "Decision-making framework for autonomous driving at road intersections: Safeguarding against collision, overly conservative behavior, and violation vehicles," IEEE Transactions on Industrial Electronics, vol. 66, No. 4, pp. 3275-3286, 2018.

T. Puphal, M. Probst, Y. Li, Y. Sakamoto, and J. Eggert, "Optimization of velocity ramps with survival analysis for Intersection merge-ins," in 2018 IEEE Intelligent Vehicles Symposium (IV). IEEE, 2018, pp. 1704-1710.

* cited by examiner

SYSTEMS AND METHODS FOR PARAMETER PREDICTION FOR AGENT MODELING

BACKGROUND

Modeling traffic participants is a complex task that has garnered significant research attention throughout the past decades. This interest is fueled by the constant growth of cities and corresponding increase in traffic on roadways in and around the cities. This interest is further fueled as autonomous vehicles become more prevalent on the roadways. Generating safe and efficient behaviors for an autonomous vehicle requires an ability to model how other traffic participants will behave since the behavior of a traffic participant depends on the behavior of surrounding traffic participants.

BRIEF DESCRIPTION

According to one aspect, a system for parameter prediction for agent modeling is provided. The system includes a memory storing instructions for execution by a processor. When executed by the processor, the instructions cause the processor to determine a first driving code for a first proximate agent at a first time. The first proximate agent and a host agent are members of an agent population traversing a roadway. The first proximate agent is traveling in a first lane of the roadway. The first driving code includes one or more of a first lateral lane displacement, a first relative velocity, and a first gap distance associated with the first proximate agent. When executed by the processor, the instructions also cause the processor to determine a first set of agent specific parameters for the first proximate agent based on the first driving code. When executed by the processor, the instructions further cause the processor to calculate a first predicted acceleration for the first proximate agent based on the first set of agent specific parameters. The first predicted acceleration is for a second time after the first time. When executed by the processor, the instructions cause the processor to determine a first steering parameter for the first proximate agent. When executed by the processor, the instructions yet further cause the processor to determine a first predicted behavior of the first proximate agent based on the first predicted acceleration and the first steering parameter. When executed by the processor, the instructions cause the processor to control the host agent based on the first predicted behavior of the first proximate agent.

According to another aspect, a computer-implemented method for parameter prediction for agent modeling is provided. The computer-implemented method includes determining a first driving code for a first proximate agent at a first time. The first proximate agent and a host agent are members of an agent population traversing a roadway. The first proximate agent is traveling in a first lane of the roadway. The first driving code includes one or more of a first lateral lane displacement, a first relative velocity, and a first gap distance associated with the first proximate agent. The computer-implemented method also includes determining a first set of agent specific parameters for the first proximate agent based on the first driving code. The computer-implemented method further includes calculating a first predicted acceleration for the first proximate agent based on the first set of agent specific parameters. The first predicted acceleration is for a second time after the first time. The computer-implemented method yet further includes determining a first steering parameter for the first proximate agent. The computer-implemented method includes determining a first predicted behavior of the first proximate agent based on the first predicted acceleration and the first steering parameter. The computer-implemented method also includes controlling the host agent based on the first predicted behavior of the first proximate agent.

According to a further aspect, a non-transitory computer readable storage medium storing instructions that when executed by a computer having a processor to perform a method for parameter prediction for agent modeling is provided. The method includes determining a first driving code for a first proximate agent at a first time. The first proximate agent and a host agent are members of an agent population traversing a roadway. The first proximate agent is traveling in a first lane of the roadway. The first driving code includes one or more of a first lateral lane displacement, a first relative velocity, and a first gap distance associated with the first proximate agent. The method also includes determining a first set of agent specific parameters for the first proximate agent based on the first driving code. The method further includes calculating a first predicted acceleration for the first proximate agent based on the first set of agent specific parameters. The first predicted acceleration is for a second time after the first time. The method yet further includes determining a first steering parameter for the first proximate agent. The method includes determining a first predicted behavior of the first proximate agent based on the first predicted acceleration and the first steering parameter. The method also includes controlling the host agent based on the first predicted behavior of the first proximate agent.

DETAILED DESCRIPTION

Figure 1:
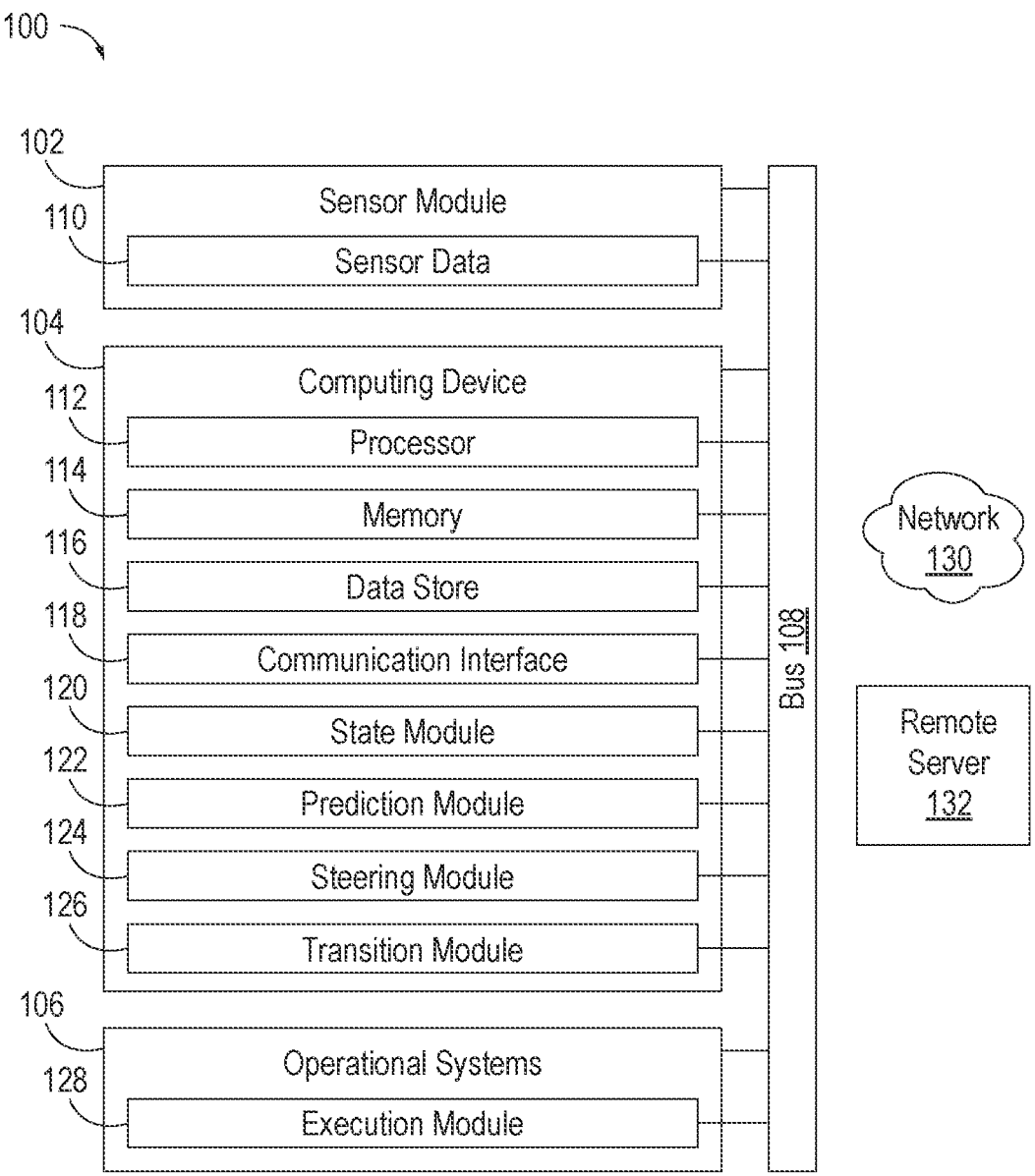
FIG. 1 is an exemplary component diagram of a system for parameter prediction for agent modeling, according to one aspect.

As discussed above, modeling traffic participants is a complex task. Predicting behaviors for an autonomous agent requires an ability to model how other traffic participants will behave. Since the behavior of a host agent depends on the behavior of surrounding proximate agents as well as the host agent, the population of agents may be modeled by modeling each agent in the population. For example, in a vehicular embodiment, the host agent is a host vehicle that traversing a roadway in an at least partially autonomous manner. To operate, the host vehicle may model the behavior of other vehicles on the roadway.

Typically, methods for modeling agent behavior are based on the acceleration of each agent in the population. However, acceleration is hard to measure accurately. For example, measuring the acceleration of an agent may include determining changes in velocity, but under normal driving conditions, the agent may be traveling at a constant velocity. Since there are no appreciable changes in velocity when the agent is traveling at a constant velocity, the acceleration is null. As another example, measuring the acceleration of an agent may include double differentiating position of the agent. However, double differentiation of the position introduces noise to the acceleration measurement. Therefore, it is difficult to determine an acceleration for the agent.

The systems and methods for parameter prediction for agent modeling provided herein, predict agent specific parameters from other, more easily observable, behaviors. Specifically, agent specific parameters are determined from state parameters including lateral lane displacement, relative velocity, and headway spacing of agents. An individualized model for agents of a population may be easily ascertained based on observable state parameters that are used to determine agent specific parameters. For example, with regard to the vehicular embodiment, a behavior prediction for the agent may be determined based on the agent specific parameters and a steering parameter of the agent. Other agents may then be autonomously controlled based on the behavior prediction.

Definitions

The following includes definitions of selected terms employed herein. The definitions include various examples and/or forms of components that fall within the scope of a term and that may be used for implementation. The examples are not intended to be limiting. Furthermore, the components discussed herein, may be combined, omitted, or organized with other components or into different architectures.

"Agent" as used herein are machines that move through or manipulate an environment. Exemplary agents may include, but is not limited to, robots, vehicles, or other self-propelled machines. The agent may be autonomously, semi-autonomously, or manually operated.

"Agent system," as used herein may include, but is not limited to, any automatic or manual systems that may be used to enhance the agent, propulsion, and/or safety. Exemplary systems include, but are not limited to: an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a steering system, a transmission system, brake pedal systems, an electronic power steering system, visual devices (e.g., camera systems, proximity sensor systems), an electronic pretensioning system, a monitoring system, a passenger detection system, a suspension system, a seat configuration system, a cabin lighting system, an audio system, a sensory system, an interior or exterior camera system among others.

"Bus," as used herein, refers to an interconnected architecture that is operably connected to other computer components inside a computer or between computers. The bus may transfer data between the computer components. The bus may be a memory bus, a memory processor, a peripheral bus, an external bus, a crossbar switch, and/or a local bus, among others. The bus may also be a bus that interconnects components inside an agent using protocols such as Media Oriented Systems Transport (MOST), Controller Area network (CAN), Local Interconnect network (LIN), among others.

"Component," as used herein, refers to a computer-related entity (e.g., hardware, firmware, instructions in execution, combinations thereof). Computer components may include, for example, a process running on a processor, a processor, an object, an executable, a thread of execution, and a computer. A computer component(s) may reside within a process and/or thread. A computer component may be localized on one computer and/or may be distributed between multiple computers.

"Computer communication," as used herein, refers to a communication between two or more communicating devices (e.g., computer, personal digital assistant, cellular telephone, network device, vehicle, computing device, infrastructure device, roadside equipment) and may be, for example, a network transfer, a data transfer, a file transfer, an applet transfer, an email, a hypertext transfer protocol (HTTP) transfer, and so on. A computer communication may occur across any type of wired or wireless system and/or network having any type of configuration, for example, a local area network (LAN), a personal area network (PAN), a wireless personal area network (WPAN), a wireless network (WAN), a wide area network (WAN), a metropolitan area network (MAN), a virtual private network (VPN), a cellular network, a token ring network, a point-to-point network, an ad hoc network, a mobile ad hoc network, a vehicular ad hoc network (VANET), a vehicle-to-vehicle (V2V) network, a vehicle-to-everything (V2X) network, a vehicle-to-infrastructure (V2I) network, among others. Computer communication may utilize any type of wired, wireless, or network communication protocol including, but not limited to, Ethernet (e.g., IEEE 802.3), WiFi (e.g., IEEE 802.11), communications access for land mobiles (CALM), WiMax, Bluetooth, Zigbee, ultra-wideband (UWAB), multiple-input and multiple-output (MIMO), telecommunications and/or cellular network communication (e.g., SMS, MMS, 3G, 4G, LTE, 5G, GSM, CDMA, WAVE), satellite, dedicated short range communication (DSRC), among others.

"Communication interface" as used herein may include input and/or output devices for receiving input and/or devices for outputting data. The input and/or output may be for controlling different agent features, which include various agent components, systems, and subsystems. Specifically, the term "input device" includes, but is not limited to: keyboard, microphones, pointing and selection devices, cameras, imaging devices, video cards, displays, push buttons, rotary knobs, and the like. The term "input device" additionally includes graphical input controls that take place within a user interface which may be displayed by various types of mechanisms such as software and hardware-based controls, interfaces, touch screens, touch pads or plug and play devices. An "output device" includes, but is not limited to, display devices, and other devices for outputting information and functions.

"Computer-readable medium," as used herein, refers to a non-transitory medium that stores instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device may read.

"Database," as used herein, is used to refer to a table. In other examples, "database" may be used to refer to a set of tables. In still other examples, "database" may refer to a set of data stores and methods for accessing and/or manipulating those data stores. In one embodiment, a database may be stored, for example, at a disk, data store, and/or a memory. A database may be stored locally or remotely and accessed via a network.

"Data store," as used herein may be, for example, a magnetic disk drive, a solid-state disk drive, a floppy disk drive, a tape drive, a Zip drive, a flash memory card, and/or a memory stick. Furthermore, the disk may be a CD-ROM (compact disk ROM), a CD recordable drive (CD-R drive), a CD rewritable drive (CD-RW drive), and/or a digital video ROM drive (DVD ROM). The disk may store an operating system that controls or allocates resources of a computing device.

"Display," as used herein may include, but is not limited to, LED display panels, LCD display panels, CRT display, touch screen displays, among others, that often display information. The display may receive input (e.g., touch input, keyboard input, input from various other input devices, etc.) from a user. The display may be accessible through various devices, for example, though a remote system. The display may also be physically located on a portable device, mobility device, or host.

"Logic circuitry," as used herein, includes, but is not limited to, hardware, firmware, a non-transitory computer readable medium that stores instructions, instructions in execution on a machine, and/or to cause (e.g., execute) an action(s) from another logic circuitry, module, method and/or system. Logic circuitry may include and/or be a part of a processor controlled by an algorithm, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic. Similarly, where a single logic is described, it may be possible to distribute that single logic between multiple physical logics.

"Memory," as used herein may include volatile memory and/or nonvolatile memory. Non-volatile memory may include, for example, ROM (read only memory), PROM (programmable read only memory), EPROM (erasable PROM), and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory may store an operating system that controls or allocates resources of a computing device.

"Module," as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module may also include logic, a software-controlled microprocessor, a discrete logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

"Operable connection," or a connection by which entities are "operably connected," is one in which signals, physical communications, and/or logical communications may be sent and/or received. An operable connection may include a wireless interface, firmware interface, a physical interface, a data interface, and/or an electrical interface.

"Portable device," as used herein, is a computing device typically having a display screen with user input (e.g., touch, keyboard) and a processor for computing. Portable devices include, but are not limited to, handheld devices, mobile devices, smart phones, laptops, tablets, e-readers, smart speakers. In some embodiments, a "portable device" could refer to a remote device that includes a processor for computing and/or a communication interface for receiving and transmitting data remotely.

"Processor," as used herein, processes signals and performs general computing and arithmetic functions. Signals processed by the processor may include digital signals, data signals, computer instructions, processor instructions, messages, a bit, a bit stream, that may be received, transmitted and/or detected. Generally, the processor may be a variety of various processors including multiple single and multicore processors and co-processors and other multiple single and multicore processor and co-processor architectures. The processor may include logic circuitry to execute actions and/or algorithms.

"Vehicle," as used herein, refers to any moving vehicle that is capable of carrying one or more users and is powered by any form of energy. The term "vehicle" includes, but is not limited to cars, trucks, vans, minivans, SUVs, motorcycles, scooters, boats, go-karts, amusement ride cars, rail transport, personal watercraft, and aircraft. Further, the term "vehicle" may refer to an electric vehicle (EV) that is powered entirely or partially by one or more electric motors powered by an electric battery.

I. System Overview

Referring now to the drawings, the drawings are for purposes of illustrating one or more exemplary embodiments and not for purposes of limiting the same. FIG. 1 is an exemplary component diagram of an operating environment 100 for parameter prediction for agent modeling, according to one aspect.

The operating environment 100 includes a sensor module 102, a computing device 104, and operational systems 106 interconnected by a bus 108. The components of the operating environment 100, as well as the components of other systems, hardware architectures, and software architectures discussed herein, may be combined, omitted, or organized into different architectures for various embodiments. The computing device 104 may be implemented with a device or remotely stored.

Figure 2:
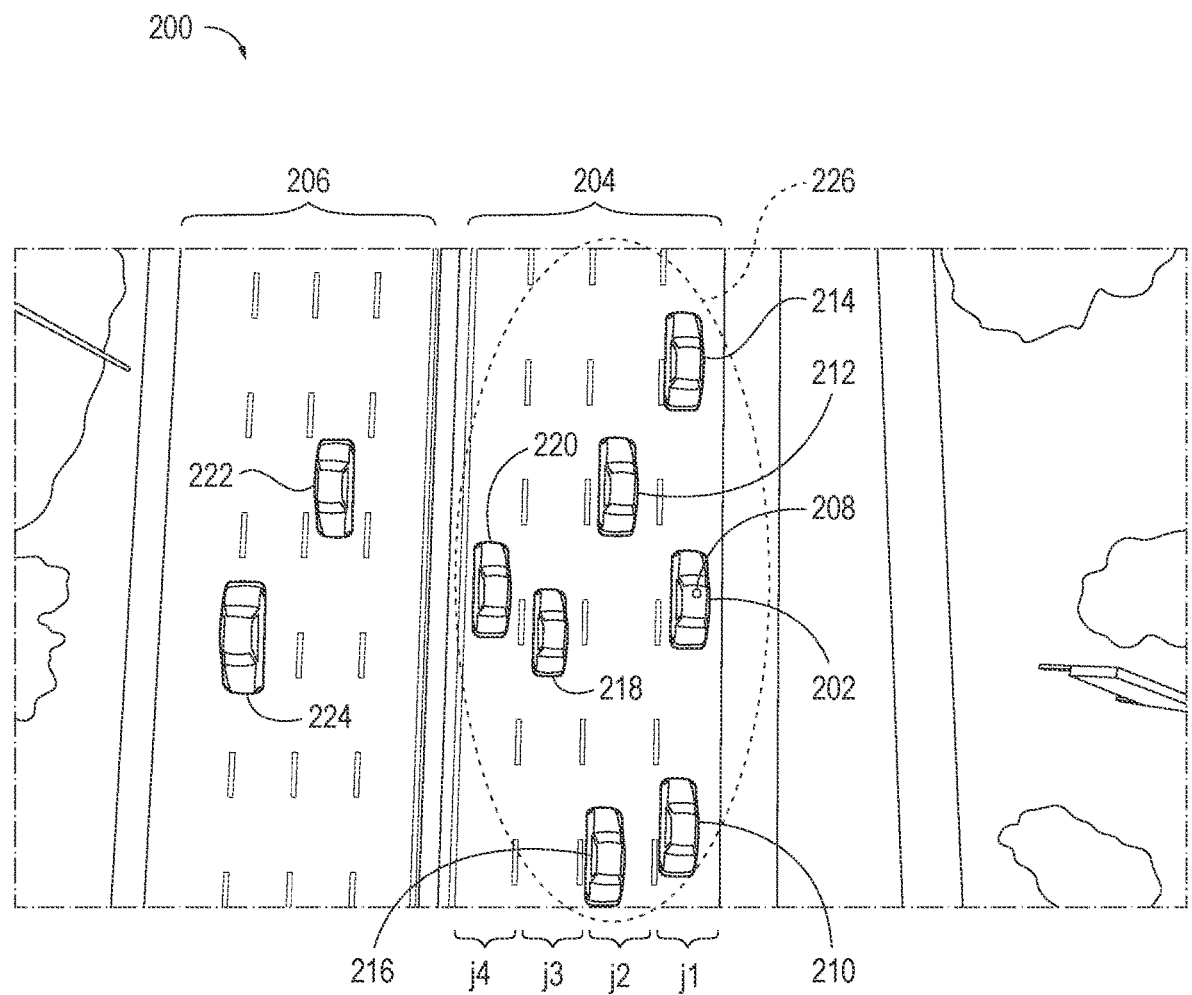
FIG. 2 is an exemplary agent environment, according to one aspect.

The computing device 104 may be implemented as a part of a host agent, such as the host agent 202 of the roadway 200, shown in FIG. 2. The host agent 202 may be a bipedal, two-wheeled or four-wheeled robot, a vehicle, or a self-propelled machine. The host agent 202 may take the form of all or a portion of a robot. The computing device 104 may be implemented as part of a telematics unit, a head unit, a navigation unit, an infotainment unit, an electronic control unit, among others of the host agent 202. In other embodiments, the components and functions of the computing device 104 may be implemented with other devices (e.g., a portable device) or another device connected via a network (e.g., a network 130).

The roadway 200 may be any type of road, highway, freeway, or travel route. The roadway 200 may include traffic traveling in opposing longitudinal directions. For example, the roadway 200 may include a first segment 204 traveling in a first longitudinal direction and a second segment 206 traveling in a second longitudinal direction opposite the first longitudinal direction. The first segment 204 and the second segment 206 may have any number of lanes. For example, the first segment 204 may include four lanes, namely, a first lane $j_1$, a second lane $j_2$, a third lane $j_3$, and a fourth lane $j_4$, with agents traveling in the same longitudinal direction. The lanes $j_1$-$j_4$ have a path shape that is a line that may be straight, curved, have turns, etc. The roadway 200 may have various configurations not shown in FIG. 2 and may have any number of lanes. In one embodiment, the host agent 202 may be driving in first lane, $j_1$, following the trajectory of the path shape.

The host agent 202 may include sensors for sensing objects and the roadway 200 including other agents. For example, the host agent 202 may include an optical sensor 208. The optical sensor 208 may be a light sensor to capture light data from around the host agent 202. For example, a light sensor may rotate 360 degrees around host agent 202 and collect the sensor data 110 in sweeps. Conversely, an optical sensor 208 may be omnidirectional and collect sensor data 110 from all directions simultaneously. The optical sensor 208 of an agent may emit one or more laser beams of ultraviolet, visible, or near infrared light toward the surrounding environment of the host agent 202. In some embodiments, the optical sensor 208 may be a monocular camera.

In addition to the host agent 202, a number of proximate agents may also be travelling along the roadway 200, including, a first proximate agent 210, a second proximate agent 212, a third proximate agent 214, a fourth proximate agent 216, a fifth proximate agent 218, a sixth proximate agent 220, a seventh proximate agent 222, and an eighth proximate agent 224, although it is appreciated that any number of agents may be present on the roadway 200. The systems and methods will be described with respect to the host agent 202 for clarity. However, any or all of the proximate agents 210-224 may also act as host agents.

The computing device 104 may be capable of providing wired or wireless computer communications utilizing various protocols to send/receive electronic signals internally to/from components of the operating environment 100. Additionally, the computing device 104 may be operably connected for internal computer communication via the bus 108 (e.g., a Controller Area Network (CAN) or a Local Interconnect Network (LIN) protocol bus) to facilitate data input and output between the computing device 104 and the components of the operating environment 100.

The optical sensor 208 may positioned on the host agent 202. For example, suppose that the host agent 202 is a vehicle. One or more sensors may be positioned at external front and/or side portions of the host agent 202, including, but not limited to different portions of the agent bumper, agent front lighting units, agent fenders, and the windshield. Additionally, the sensors may be disposed at internal portions of the host agent 202 including, in a vehicular embodiment, the agent dashboard (e.g., dash mounted camera), rear side of a agent rear view mirror, etc. Sensors may be positioned on a planar sweep pedestal (not shown) that allows the optical sensor 208 to be rotated to capture images of the environment at various angles.

The sensors, such as the optical sensor 208, and/or the sensor module 102 are operable to sense a measurement of data associated with the host agent 202, the operating environment 100, the roadway 200, and/or the operational systems 106 and generate a data signal indicating said measurement of data. These data signals may be converted into other data formats (e.g., numerical) and/or used by the sensor module 102, the computing device 104, and/or the operational systems 106 to generate sensor data 110 including data metrics and parameters. The sensor data 110 may be received by the sensor module 102 as an input image.

The sensor range of the sensors may be determined based on ability of the sensor to receive sensor data 110. For example, the sensor ranger of the optical sensor 208 may be the distance (e.g., 100 yards, 500 yards, 750 yards, etc.) from which the optical sensor 208 may receive the sensor data 110 from the physical environment, such as the roadway 200. The sensor range may additionally or alternatively be based on the distance from sensors that the sensor module 102 is able to resolve the sensor data 110.

The computing device 104 includes a processor 112, a memory 114, a data store 116, and a communication interface 118, which are each operably connected for computer communication via a bus 108 and/or other wired and wireless technologies. The communication interface 118 provides software and hardware to facilitate data input and output between the components of the computing device 104 and other components, networks, and data sources.

In one embodiment, the communication interface 118 may exchange data and/or transmit messages with the proximate agents 210-224 and/or devices via a transceiver or other communication hardware and protocols. For example, a transceiver (not shown) may exchange data with the first proximate agent 210 via a remote transceiver of the first proximate agent 210. In some embodiments, the host agent 202 and first proximate agent 210 may also exchange data (e.g., agent data as described herein) over remote networks by utilizing a wireless network antenna, roadside equipment, and/or the communication network (e.g., a wireless communication network), or other wireless network connections in sensor range of the communicating agents. For example, if the host vehicle 202 includes a transceiver, the proximate agent, such as the first proximate vehicle 210 is in sensor range of the host vehicle 202 to exchange data.

As mentioned above, in some embodiments, data transmission may be executed at and/or with other infrastructures and servers. For example, the communication interface 118 may transmit and receive information, such as roadway data or agent data, directly or indirectly to and from a remote server 132 over the network 130. The remote server 132 may include similar components as the computing device 104 such as a remote processor, a remote memory, and a remote communication interface that are configured to be in communication with one another. Thus, the communication interface 118 may be used to receive and transmit information to and from the remote server 132 and other servers, processors, and information providers through the network 130.

Alternatively, the proximate agents 210-224 may communicate by way of remote networks, such as a wireless network antenna and/or roadside equipment. For example, if the third proximate agent 214 is out of sensor range of the host agent 202, then another proximate agent, such as the second proximate agent 212, may relay sensor data or messages to the host agent 202. In another embodiment, the out of range agents may communicate with the host agent via a cellular network using the wireless network antenna.

Referring back to the computing device 104, a state module 120, a prediction module 122, a steering module 124, and a transition module 126 for parameter prediction may be included for agent modeling facilitated by the components of the operating environment 100. The state module 120, the prediction module 122, the steering module 124, and/or the transition module 126, may be incorporate machine learning. For example, the state module 120, the prediction module 122, the steering module 124, and/or the transition module 126 may use a non-parametric supervised learning method, such as a k-nearest neighbors (k-NN). Other example of machine learning methods may include decision trees, ensembles (e.g., bagging boosting, random forest, etc.), linear regression, naive Bayes, artificial neural networks, logistic regression, perceptron, relevance vector machine (RVM), and support vector machine (SVM), among others.

The computing device 104 is also operably connected for computer communication (e.g., via the bus 108 and/or the communication interface 118) to one or more operational systems 106. The operational systems 106 may include, but are not limited to, any automatic or manual systems that may be used to enhance the host agent 202, operation, and/or safety. The operational systems 106 include an execution module 128. The execution module 128 monitors, analyses, and/or operates the host agent 202, to some degree. For example, the execution module 128 may store, calculate, and provide directional information and facilitate features like vectoring and obstacle avoidance among others. In a vehicular embodiment, the execution module 128 may provide operational data to agent systems, such as the steering system, that cause the host agent 202 to operate autonomously. The operational systems 106 may be dependent on the implementation. In some embodiments, the execution module 128 may be a Proportional, Integral, Derivative (PID) controller. Continuing the vehicular embodiment described above, the execution module 128 may be a longitudinal PID controller.

The operational systems 106 also include and/or are operably connected for computer communication to the sensor module 102. For example, one or more sensors of the sensor module 102, such as the optical sensor 208, may be incorporated with execution module 128 to monitor characteristics of the environment of the host agent 202 or the host agent 202 itself. For example, in the vehicular embodiment, the optical sensor 208 may be incorporated with execution module 128 to monitor characteristics of the roadway 200. Suppose that the execution module 128 is facilitating the host agent 202 traversing the roadway 200 to confirm that agents present on the roadway 200 are behaving as expected.

The sensor module 102, the computing device 104, and/or the operational systems 106 are also operatively connected for computer communication to the network 130. The network 130 is, for example, a data network, the Internet, a wide area network (WAN) or a local area (LAN) network. The network 130 serves as a communication medium to various remote devices (e.g., databases, web servers, remote servers, application servers, intermediary servers, client machines, other portable devices). Detailed embodiments describing exemplary methods using the system and network configuration discussed above will now be discussed in detail.

II. Methods for Parameter Prediction

Figure 3:
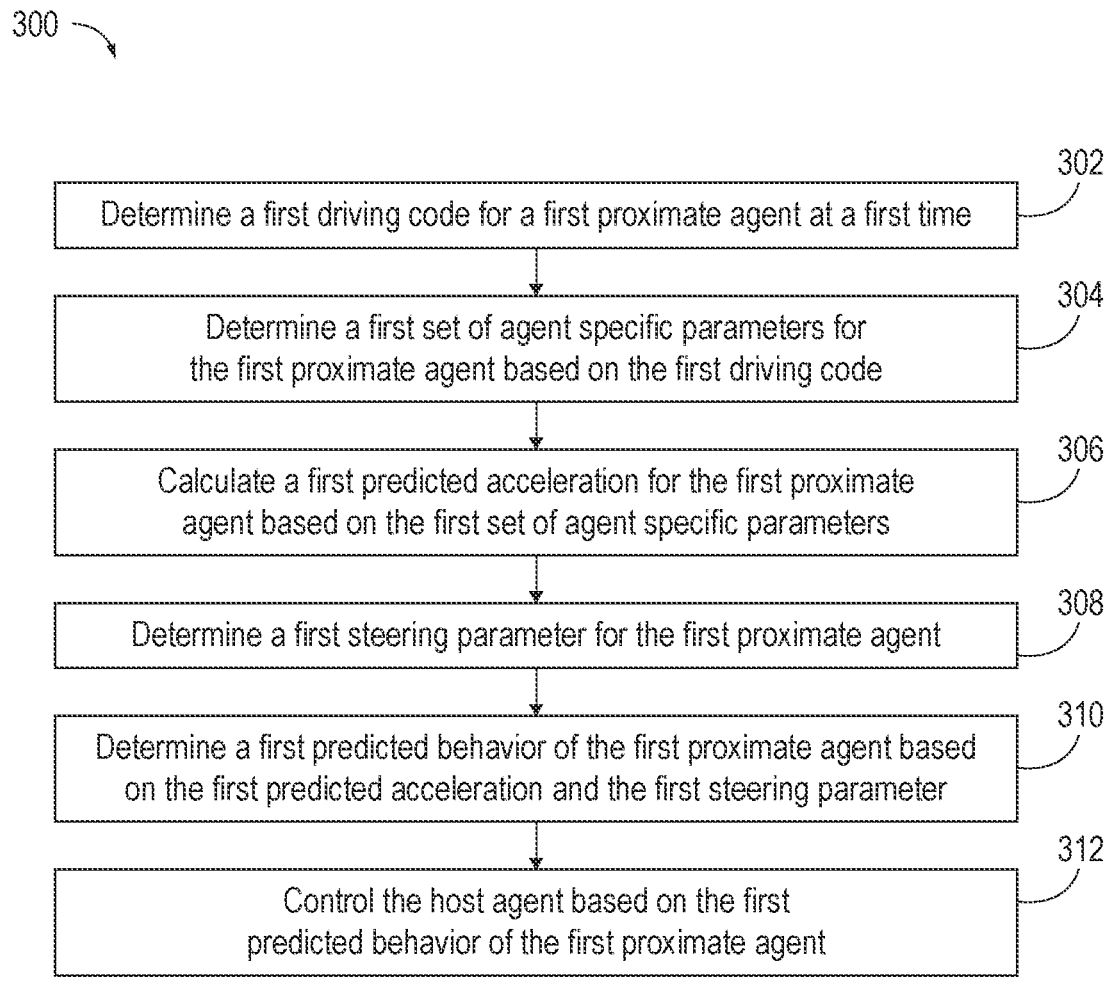
FIG. 3 is an exemplary process flow of a method for parameter prediction for agent modeling, according to one aspect.

Referring now to FIG. 3, a method 300 for parameter prediction for agent modeling will now be described according to an exemplary embodiment. FIG. 3 will also be described with reference to FIGS. 1, 2, and 4. For simplicity, the method 300 will be described as a sequence of elements, but it is understood that the elements of the method 300 may be organized into different architectures, blocks, stages, and/or processes.

At block 302, the method 300 includes a state module 120 determining a first driving code for the first proximate agent 210 at a first time. The first proximate agent 210 is a member of an agent population 226 on the roadway 200. The members of the agent population 226 are traveling on the roadway 200 in the longitudinal direction of the host agent 202. For example, the host agent 202 is traveling on the first segment 204 in a first longitudinal direction. Because the seventh proximate agent 222 and the eighth proximate agent 224 are traveling on the second segment 206 in a second longitudinal direction, the seventh proximate agent 222 and the eighth proximate agent 224 are not included in the agent population 226. Additionally, the members of the agent population 226 may also be in sensor range of the host agent 202.

The driving code includes a number of state parameters for a proximate agent including one or more of a lateral lane displacement, a relative velocity, and a gap distance. For example, the state parameters associated with the first proximate agent 210 include a first lateral lane displacement, a first relative velocity, and a first gap distance. The number of state parameters may be observable by the host agent 202 or roadside infrastructure. For example, the sensor module 102 may receive sensor data 110 from the optical sensor 208 and calculate one or more state parameters. In another embodiment, the sensor module 102 may receive sensor data 110 from agent systems and agent sensors of the proximate agent. The sensor module 102 may combine the data from the multiple sources based on timing and relative position.

The lateral lane displacement may be the lateral offset from a longitudinal centerline of the lane that the proximate agent is traveling in. For example, the first lateral lane displacement is based on a first lateral position of the first proximate agent 210 relative to a longitudinal centerline of the first lane. In a robotic embodiment, the lateral lane displacement may be based on lateral deviation from a longitudinal planned path route.

The sensor data 110 may be received from the optical sensor 208. The sensor data 110 may include a video sequence or a series of images, user inputs, and/or data from the operational systems 106. The sensor data 110 may include radar units, lidar units, image capture components, sensors, cameras, scanners (e.g., 2-D scanners or 3-D scanners), or other measurement components. The sensor module 102 or the state module 120 may calculate the first lateral lane displacement based on the sensor data 110.

In some embodiments, members of the agent population 226 may communicate via a transceiver (not shown). The transceiver may be a radio frequency (RF) transceiver may be used to receive and transmit information to and from a remote server. In some embodiments, the communication interface 118 may receive and transmit information to and from the remote server 132 including, such as sensor data 110. In some embodiments, the remote server 132 may be linked to members of the agent population, other entities, traffic infrastructures, and/or devices through a network connection, such as via the wireless network antenna, the roadside equipment, and/or other network connections. In this manner, the state module 120 may query members of the agent population 226 to determine the one or more state parameters. For example, the state module 120 may query the first proximate agent 210 for the first lateral lane displacement.

In another embodiment, the state module 120 may calculate one or more state parameters based on the collective kinematic data of each of the members of the agent population 226 at a first time. For example, the relative velocity is determined based on an average velocity of the members of the agent population to a particular proximate agent. Accordingly, the state module 120 may calculate the velocity of the agent population 226 as an average velocity of the members of the agent population 226 based on communications or the sensor data 110. For example, the state module 120 may determine the first relative velocity based on the average velocity of the members of the agent population 226 at the first time with respect to the velocity of the first proximate agent 210. Likewise, a second relative velocity is based on the average velocity of the members of the agent population 226 at the first time with respect to the velocity of the second proximate agent 212.

The gap distance is the distance between a proximate agent and the agent preceding the proximate agent. For example, if the host agent 202 is traveling in the first lane, $j_1$, and directly precedes the first proximate agent 210, then the first gap distance is between the first proximate agent 210 and the host agent 202. A fourth gap distance is then between the fourth proximate agent 216 and the proximate agent directly preceding the fourth proximate agent 216, the second proximate agent 212. Like the other state parameters, the gap distance may be determined based on communications or sensor data 110.

While the state parameters are generally described with respect to the first proximate agent 210 for brevity, state parameters may be calculated for each member of the agent population 226 in a similar manner as described above. The driving code for each proximate agent is a vector including the state parameters associated with that proximate agent. For example, the first driving code for the first proximate agent 210 may be represented as φ where the first lateral lane displacement τ, first relative velocity v, and the first gap distance ω, such that:

$$\varphi_1 = \{\tau_1, v_1, \omega_1\} \in \mathbb{R}^3$$

At block 304, the method 300 includes the state module 120 determining a first set of agent specific parameters for the first proximate agent 210 based on the first driving code. The set of agent specific parameters may include safe time headway T, maximum acceleration a, desired deceleration b, and a primary jam distances $d_0$, and a secondary jam distance $d_1$. For example, the first set of agent specific parameters may be represented as:

$$\theta_1 = \{a_1, b_1, T_1, d_{0_1}, d_{1_1}\}$$

The state module 120 may use a non-parametric supervised learning method, such as a k-nearest neighbors (k-NN), to determine the first set of agent specific parameters for the first proximate agent 210.

At block 306, the method 300 includes the prediction module 122 calculating a first predicted acceleration for the first proximate agent 210 based on the first set of agent specific parameters. The first predicted acceleration is for a second time after the first time. The first time may be a current time and the second time may be a future time that has not occurred.

The prediction module 122 may calculate the predicted acceleration based on a model such as the Intelligent Driver Model (IDM). In one example, for the first proximate agent 210, the first predicted acceleration may be calculated based on:

$$\dot{v} = a\left(1 - \left(\frac{v}{v_0}\right)^\phi - \frac{d^*(v, \delta v)^2}{d}\right)$$

where $$d^*(v, \delta v) = d_0 + d_1\left(\sqrt{\frac{v}{v_0}}\right) + Tv + \frac{v\delta v}{2\sqrt{ab}}$$

In this example, v is the current velocity of the proximate agent, δv is the difference in velocity with respect to the member of the agent population 226 preceding the proximate agent, d* is the desired minimum gap distance, and d is the actual gap distance to the member of the agent population 226 preceding the proximate agent. Some values may be based on the sensor data 110 or communications rather than agent data. For example, $v_0$ may be speed limit of the first segment 204. An acceleration exponent φ may be fixed at a predetermined value, such as 4. Accordingly, the predicted acceleration, such as the first predicted acceleration for the first proximate agent 210, may be calculated based on the set of agent specific parameters corresponding to that proximate agent, without directly measuring the acceleration of an agent.

At block 308, the method 300 includes the steering module 124 determining a first steering parameter for the first proximate agent 210. A steering parameter reflects the expected trajectory of a proximate agent at the first time. The trajectory of the proximate agent is based on the path shape of the roadway 200. Therefore, the steering parameter is based on the expected route of the proximate agent. In the vehicular embodiment, the first steering parameter for the first proximate agent 210 may be based on the path shape of the first lane, $j_1$, that the first proximate agent 210 is traveling in. The steering module 124 may calculate the steering parameter using (PID) control method. In a robotic embodiment, the steering parameter may be based on a path shape of the planned route.

At block 310, the method 300 includes the transition module 126 determining a first predicted behavior of the first proximate agent 210 based on the first predicted acceleration and the first steering parameter. In particular, to generate trajectories for members of the agent population, the transition module 126 models the transitions of the members of the agent population 226. The transition module 126 may use the kinematic bicycle model. For example, the physical state of each agent at a first time may be given the following notation. $\mathcal{T} = (\lambda_1, \ldots, \lambda_T)$ denotes a sequence of physical states for a proximate agent modeled over a finite horizon $\mathcal{T}$. $\mathcal{U} = (u_1, \ldots, u_T)$ denotes a finite sequence of control inputs. Then the transition model $\mathcal{F}$ for each time step, t, from the first time to the second time, is:

$$\lambda_{t+1} = \mathcal{F}(\lambda_t, u_{t+1})$$

Accordingly, the physical state of an agent at the first time is $\lambda_t = \{x_t, y_t, \phi_t, v_t\}$ and $u_t = \{\dot{v}_t, d_t\}$ is the control input, where $\dot{v}_t$ is the predicted acceleration for the second time and $d_t$ is the steering parameter. Then the transition model $\mathcal{F}_t(\lambda_t, u_{t+1})$ may be given by:

$$\beta_k = \tan^{-1}\left(\frac{l_r}{l_f + l_r}\tan(\delta_k)\right)$$

$$x_{k+1} = x_k + v_k\cos(\psi_k + \beta_k)\Delta t$$

$$y_{k+1} = y_k + v_k\sin(\psi_k + \beta_k)\Delta t$$

-continued $$\psi_{k+1} = \psi_k + \frac{v_k}{l_r}\sin(\beta_k)\Delta t$$

$$v_{k+1} = v_k + a_k \Delta t$$

The transition model allows the transition module 126 to simulate the members of the agent population 226, specifically the proximate agents, into the future using plausible transition dynamics. While described with respect to a first time and a second time after the first time for clarity, the predicted behavior of the members of the agent population may be calculated iteratively. For example, agent specific parameters from a second time may be used to calculate the predicted acceleration and corresponding predicted behavior for a third time after the second time.

At block 312, the method 300 includes the transition module 126 causing the host agent 202 to be controlled based on the first predicted behavior of the first proximate agent 210. In one embodiment, the host agent 202 may broadcast or transmit a communication to one or more members of the agent population 226 via the network 130. The communication may be a V2V message broadcast at a frequency and include information regarding the path planning of the host agent 202. The communication may be broadcast or transmitted without any manual user or driver intervention from the driver of the host agent 202 to start or stop the transmission of the V2V messages and/or associated information.

In another embodiment, the operational systems 106 and/or the execution module 128 may cause the host agent 202 react with a driving reaction in response to the first predicted behavior of the first proximate agent 210. In the vehicular embodiment, the operational systems 106 may communicate with agent systems to cause the host agent 202 to engage in a driving actions, such as a turn signal operation, a steering operation, a braking operation, an acceleration operation, a horn operation, etc. Accordingly, the host agent 202 may act after having received a diverse set of predicted behaviors from one or more of the members of the agent population 226. The host agent 202 is controlled based on a broader model of agent population 226.

Again, while described with specificity to the first proximate agent 210, the blocks of the method 300 may be preformed with respect to one or more members of the agent population 226. For example, the state module 120 may determine a second driving code for the second proximate agent 212 and determine a second set of agent specific parameters for the second proximate agent 212 based on the second driving code in a similar manner as described in blocks 302 and 304. The prediction module 122 may calculate a second predicted acceleration for the second proximate agent 212 based on the second set of agent specific parameters in a similar manner as described in block 306. The steering module 124 may determine a second steering parameter for the second proximate agent 212 in a similar manner as described in block 308. The transition module 126 may determine a second predicted behavior of the second proximate agent 212 based on the first predicted acceleration and the first steering parameter. The host agent 202 may then be controlled based on the first predicted behavior of the first proximate agent 210 as well as the second predicted behavior of the second proximate agent 212. In one embodiment, each agent of the agent population 226 may be modeled in the manner described in the method 300.

Therefore, the systems and methods for parameter prediction for agent modeling provided herein, predict agent specific parameters from state parameters. The state parameters may be determined from sensor data or communication. The agent specific parameters are determined from the state parameters including lateral lane displacement, relative velocity, and/or headway spacing of agents. An individualized model for agents of a population may be easily ascertained based on the state parameters. Each of the agents in an agent population 226 may be modeled in this manner to predict the behavior of the agent in the agent population 226. The host agent 202 is able to then path plan based on the predicted behavior of the agents of the agent population without having to attempt to measure the acceleration of the agents of the agent population 226.

Figure 4:
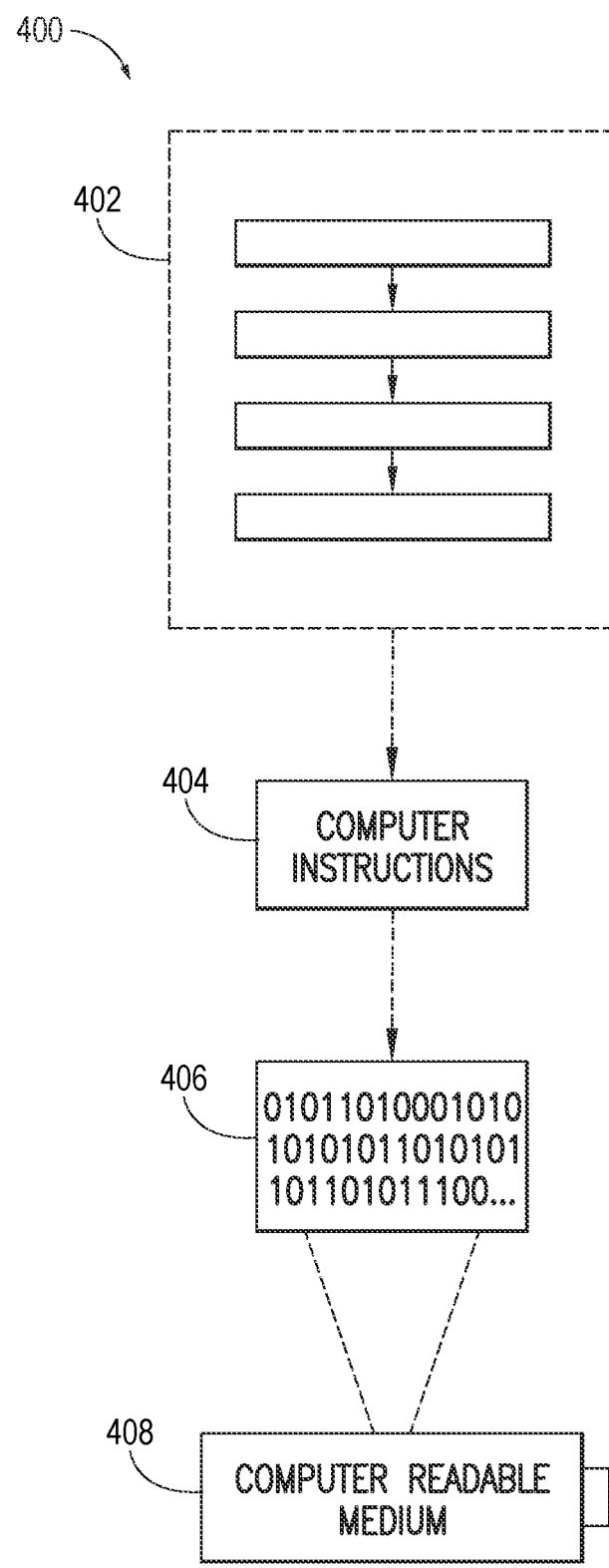
FIG. 4 is an illustration of an example computer-readable medium or computer-readable device including processor-executable instructions configured to embody one or more of the provisions set forth herein, according to one aspect.

Still another aspect involves a computer-readable medium including processor-executable instructions configured to implement one aspect of the techniques presented herein. An aspect of a computer-readable medium or a computer-readable device devised in these ways is illustrated in FIG. 4, wherein an implementation 400 includes a computer-readable medium 408, such as a CD-R, DVD-R, flash drive, a platter of a hard disk drive, etc., on which is encoded computer-readable data 406. This encoded computer-readable data 406, such as binary data including a plurality of zero's and one's as shown in 406, in turn includes a set of processor-executable computer instructions 404 configured to operate according to one or more of the principles set forth herein. In this implementation 400, the processor-executable computer instructions 404 may be configured to perform a method 402, such as the method 300 of FIG. 3. In another aspect, the processor-executable computer instructions 404 may be configured to implement a system, such as the operating environment 100 of FIG. 1. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processing unit, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Although the subject matter has been described in language specific to structural features or methodological acts, it is to be understood that the subject matter of the appended claims is not necessarily limited to the specific features or acts described above. Rather, the specific features and acts described above are disclosed as example aspects. Various operations of aspects are provided herein. The order in which one or more or all of the operations are described should not be construed as to imply that these operations are necessarily order dependent. Alternative ordering will be appreciated based on this description. Further, not all operations may necessarily be present in each aspect provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

It will be appreciated that several of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A system for parameter prediction for agent modeling, comprising:
   a memory storing instructions that when executed by a processor cause the processor to:
   determine a first driving code for a first proximate agent at a first time, wherein the first proximate agent and a host agent are members of an agent population traversing a roadway, wherein the first proximate agent is traveling in a first lane of the roadway, and wherein the first driving code includes a first lateral lane displacement, a first relative velocity, and a first gap distance associated with the first proximate agent;
   determine a first set of agent specific parameters for the first proximate agent based on the first driving code, wherein the first set of agent specific parameters include a first safe time headway, a first maximum acceleration, a first desired deceleration, and a jam distance;
   calculate a first predicted acceleration for the first proximate agent based on the first set of agent specific parameters, wherein the first predicted acceleration is for a second time after the first time;
   determine a first steering parameter for the first proximate agent;
   determine a first predicted behavior of the first proximate agent based on the first predicted acceleration and the first steering parameter; and
   control the host agent based on the first predicted behavior of the first proximate agent,
   wherein the first lateral lane displacement is based on a first lateral position of the first proximate agent relative to a longitudinal centerline of the first lane that the first proximate agent is traveling in,
   wherein the first relative velocity is determined based on an average velocity of the members of the agent population,
   wherein the first predicted acceleration is calculated without directly measuring a current acceleration of the first proximate agent and is based in part from a current velocity of the first proximate agent and a difference in velocity with respect to a member of the agent population preceding the first proximate agent.

2. The system for parameter prediction for agent modeling of claim 1, wherein the agent population includes a second proximate agent traveling in a second lane of the roadway, and wherein the instructions, when executed by the processor further cause the processor to:
   determine a second driving code for the second proximate agent;
   determine a second set of agent specific parameters for the second proximate agent based on the second driving code;
   calculate a second predicted acceleration for the second proximate agent based on the second set of agent specific parameters;
   determine a second steering parameter for the second proximate agent; and
   determine a second predicted behavior of the second proximate agent based on the first predicted acceleration and the first steering parameter, wherein the host agent is further controlled based on the second predicted behavior of the second proximate agent.

3. The system for parameter prediction for agent modeling of claim 1, wherein the members of the agent population are traveling on the roadway in a longitudinal direction of the host agent and are in sensor range of the host agent.

4. The system for parameter prediction for agent modeling of claim 1, wherein the host agent is traveling in the first lane and directly precedes the first proximate agent, and wherein the first gap distance is between the first proximate agent and the host agent.

5. The system for parameter prediction for agent modeling of claim 1, wherein the first steering parameter is based on a path shape of the first lane.

6. The system for parameter prediction for agent modeling of claim 1, wherein the first steering parameter is determined using a proportional, integral, derivative control method.

7. The system for parameter prediction for agent modeling of claim 1, wherein the processor is configured to determine the first set of agent specific parameters using a non-parametric supervised learning method.

8. A method for parameter prediction for agent modeling, comprising:
   determining a first driving code for a first proximate agent at a first time, wherein the first proximate agent and a host agent are members of an agent population traversing a roadway, wherein the first proximate agent is traveling in a first lane of the roadway, and wherein the first driving code includes one or more of a first lateral lane displacement, a first relative velocity, and a first gap distance associated with the first proximate agent;
   determining a first set of agent specific parameters for the first proximate agent based on the first driving code, wherein the first set of agent specific parameters include a first safe time headway, a first maximum acceleration, a first desired deceleration, and a jam distance;

calculating a first predicted acceleration for the first proximate agent based on the first set of agent specific parameters, wherein the first predicted acceleration is for a second time after the first time;

determining a first steering parameter for the first proximate agent;

determining a first predicted behavior of the first proximate agent based on the first predicted acceleration and the first steering parameter; and controlling the host agent based on the first predicted behavior of the first proximate agent, wherein the first lateral lane displacement is based on a first lateral position of the first proximate agent relative to a longitudinal centerline of the first lane that the first proximate agent is traveling in, wherein the first relative velocity is determined based on an average velocity of the members of the agent population, wherein the first predicted acceleration is calculated without directly measuring a current acceleration of the first proximate agent and is based in part from a current velocity of the first proximate agent and a difference in velocity with respect to a member of the agent population preceding the first proximate agent.

9. The method for parameter prediction for agent modeling of claim 8, wherein the agent population includes a second proximate agent traveling in a second lane of the roadway, and wherein the method further includes:

determining a second driving code for the second proximate agent;

determining a second set of agent specific parameters for the second proximate agent based on the second driving code;

calculating a second predicted acceleration for the second proximate agent based on the second set of agent specific parameters;

determining a second steering parameter for the second proximate agent; and determining a second predicted behavior of the second proximate agent based on the first predicted acceleration and the first steering parameter, wherein the host agent is further controlled based on the second predicted behavior of the second proximate agent.

10. The method for parameter prediction for agent modeling of claim 8, wherein the members of the agent population are traveling on the roadway in a longitudinal direction of the host agent and are in sensor range of the host agent.

11. The method for parameter prediction for agent modeling of claim 8, wherein the first steering parameter is based on a path shape of the first lane.

12. The method for parameter prediction for agent modeling of claim 8, wherein the first steering parameter is determined using a proportional, integral, derivative control method.

13. A non-transitory computer readable storage medium storing instructions that when executed by a computer having a processor to perform a method for parameter prediction for agent modeling, the method comprising:

determining a first driving code for a first proximate agent at a first time, wherein the first proximate agent and a host agent are members of an agent population traversing a roadway, wherein the first proximate agent is traveling in a first lane of the roadway, and wherein the first driving code includes one or more of a first lateral lane displacement, a first relative velocity, and a first gap distance associated with the first proximate agent;

determining a first set of agent specific parameters for the first proximate agent based on the first driving code, wherein the first set of agent specific parameters include a first safe time headway, a first maximum acceleration, a first desired deceleration, and a jam distance;

calculating a first predicted acceleration for the first proximate agent based on the first set of agent specific parameters, wherein the first predicted acceleration is for a second time after the first time;

determining a first steering parameter for the first proximate agent;

determining a first predicted behavior of the first proximate agent based on the first predicted acceleration and the first steering parameter; and controlling the host agent based on the first predicted behavior of the first proximate agent, wherein the first lateral lane displacement is based on a first lateral position of the first proximate agent relative to a longitudinal centerline of the first lane that the first proximate agent is traveling in, wherein the first relative velocity is determined based on an average velocity of the members of the agent population, wherein the first predicted acceleration is calculated without directly measuring a current acceleration of the first proximate agent and is based in part from a current velocity of the first proximate agent and a difference in velocity with respect to a member of the agent population preceding the first proximate agent.

14. The non-transitory computer readable storage medium implemented method of claim 13, wherein the agent population includes a second proximate agent traveling in a second lane of the roadway, and wherein the method further includes:

determining a second driving code for the second proximate agent;

determining a second set of agent specific parameters for the second proximate agent based on the second driving code;

calculating a second predicted acceleration for the second proximate agent based on the second set of agent specific parameters;

determining a second steering parameter for the second proximate agent; and determining a second predicted behavior of the second proximate agent based on the first predicted acceleration and the first steering parameter, wherein the host agent is further controlled based on the second predicted behavior of the second proximate agent.

15. The non-transitory computer readable storage medium implemented method of claim 13, wherein the host agent is traveling in the first lane and directly precedes the first proximate agent, and wherein the first gap distance is between the first proximate agent and the host agent.

* * * * *